(12) United States Patent
Saito et al.

(10) Patent No.: US 9,640,206 B1
(45) Date of Patent: May 2, 2017

(54) THERMAL ASSISTED MAGNETIC RECORDING HEAD WITH PLASMON GENERATOR

(71) Applicant: TDK Corporation, Tokyo (JP)

(72) Inventors: Masahiro Saito, Tokyo (JP); Koji Shimazawa, Tokyo (JP); Daisuke Miyauchi, Tokyo (JP); Ryo Hosoi, Tokyo (JP); Makoto Isogai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/166,792

(22) Filed: May 27, 2016

(51) Int. Cl.
*G11B 13/04* (2006.01)
*G11B 5/40* (2006.01)
*G11B 5/48* (2006.01)
*G11B 5/596* (2006.01)
*G11B 5/00* (2006.01)

(52) U.S. Cl.
CPC .............. *G11B 5/40* (2013.01); *G11B 5/4826* (2013.01); *G11B 5/596* (2013.01); *G11B 2005/0021* (2013.01)

(58) Field of Classification Search
None
See application file for complete search history.

(56) References Cited

U.S. PATENT DOCUMENTS

| 7,529,158 | B2 | 5/2009 | Matsumoto et al. |
| 8,036,069 | B1 * | 10/2011 | Jin .......................... G02B 6/107 360/245.3 |
| 8,169,861 | B1 * | 5/2012 | Komura ................ G11B 5/3116 369/112.27 |
| 8,305,849 | B2 | 11/2012 | Hara et al. |
| 8,576,674 | B2 | 11/2013 | Sasaki et al. |
| 8,605,387 | B2 | 12/2013 | Hirata et al. |
| 8,964,514 | B2 | 2/2015 | Hirata et al. |

(Continued)

OTHER PUBLICATIONS

K. Shimazawa et al., "Enhanced GMR Ratio of Dual Spin Valve With Monolayer Pinned Structure", IEEE Transactions on Magnetics, vol. 42, No. 2, pp. 120-125, Feb. 2006.

*Primary Examiner* — Peter Vincent Agustin
(74) *Attorney, Agent, or Firm* — Posz Law Group, PLC

(57) ABSTRACT

A thermal assisted magnetic recording head executing magnetic recording while locally heating a magnetic recording medium includes a plasmon generator generating surface plasmon and generating near-field light from the surface plasmon at an end surface situated on an air bearing surface facing the magnetic recording medium, a main pole being in contact with the plasmon generator and exposed on the air bearing surface, a metal protective layer situated on an opposite side to the plasmon generator when viewed from the main pole and positioned to overlap with a part of the main pole when viewed from one side in a down track direction, and an overcoat protective layer covering the metal protective layer. The overcoat protective layer is formed on a flat surface at least at a position where it overlaps with the main pole when viewed from one side in the down track direction, and the metal protective layer configures a part of the flat surface. Moreover, the overcoat protective layer has a flat bottom surface at least at a position where it overlaps with the main pole when viewed from one side in the down track direction.

12 Claims, 17 Drawing Sheets

(56) References Cited

U.S. PATENT DOCUMENTS

| | | | |
|---|---|---|---|
| 2007/0188921 A1* | 8/2007 | Mochizuki | G11B 5/1278 360/125.09 |
| 2010/0315735 A1* | 12/2010 | Zhou | G11B 5/02 360/59 |
| 2011/0090587 A1* | 4/2011 | Chou | G11B 5/314 360/59 |
| 2012/0084969 A1* | 4/2012 | Tanaka | G11B 5/6088 29/603.01 |
| 2012/0092971 A1* | 4/2012 | Schreck | G11B 5/314 369/13.24 |
| 2014/0269237 A1* | 9/2014 | Sasaki | B23K 10/00 369/13.24 |

\* cited by examiner

THERMAL ASSISTED MAGNETIC RECORDING HEAD WITH PLASMON GENERATOR

BACKGROUND OF THE INVENTION

1. Field of the Invention

The present invention relates to a thermal assisted magnetic recording head with a plasmon generator.

2. Description of the Related Art

In recent years, in magnetic recording devices typified by magnetic disc devices, there has been a need for performance improvement of a thin-film magnetic head and a magnetic recording medium in association with higher recording density. As a thin-film magnetic head, a composite type thin-film magnetic head is widely used in which a reproducing head having a magnetoresistive effect element for reading, and a recording head having an induction type electromagnetic transducer element for writing, are layered on a substrate.

A magnetic recording medium is a discontinuous medium in which magnetic grains are aggregated, where each magnetic grain has a single magnetic domain structure. Each recording bit on a magnetic recording medium is configured with a plurality of magnetic grains. In order to enhance the recording density, the unevenness of the boundaries between adjacent recording bits must be smaller, and the magnetic grains must be reduced in size for this purpose. However, smaller magnetic grains, namely magnetic grains with smaller volumes, cause a reduction in thermal stability of magnetization. In order to solve this problem, it is effective to increase anisotropic energy of magnetic grains. However, high anisotropic energy of magnetic grains increases the magnetic coercive force of a magnetic recording medium and makes it difficult to record information with an existing magnetic head.

As a method of solving this problem, so-called thermal assisted magnetic recording is proposed. In this method, a magnetic recording medium with greater coercive force can be used. When information is recorded, a magnetic field and heat are simultaneously applied to a portion of the magnetic recording medium where information is recorded, and temperature of the portion is increased. Information is recorded to the portion where the magnetic coercive force has been decreased with this process by the magnetic field. Hereafter, the magnetic head used in thermal assisted magnetic recording is referred to as a thermal assisted magnetic recording head (TAMR head).

A typical TAMR includes a core that propagates light irradiated from a laser diode and a plasmon generator that generates near-field light. The plasmon generator is coupled with portion of the propagated light propagates in the core in the surface plasmon mode and generates a surface plasmon, propagates the surface plasmon up to the end surface situated on the air bearing surface, and generates near-field light at the end surface.

In the existing TAMR head, deterioration of recording properties (the S/N ratio and the like) associated with continuous recording is confirmed. Deformation of the plasmon generator, particularly recession of the end surface of the plasmon generator from the air bearing surface facing the magnetic recording medium, has been recognized as the main factor. For example, deformation due to agglomeration at the end surface of the plasmon generator is an issue. The agglomeration is a phenomenon of metal atoms gathering, which results from diffusion and migration of metal atoms due to heat and stress as driving force. The air bearing surface of a magnetic head slider and the surface of a magnetic recording medium are asperous, and the end surface of the plasmon generator sometimes makes contact with the magnetic recording medium while the magnetic recording device is in operation. Raised temperature and increased stress due to the impact causes the agglomeration. The agglomeration is likely to cause the end surface of the plasmon generator to recess from the air bearing surface. Consequently, the distance between the plasmon generator and the magnetic recording medium is increased, and the ability of heating the magnetic recording medium deteriorates with time, causing deterioration in the S/N ratio and the like. Therefore, it is desired to suppress the agglomeration in the plasmon generator in order to ensure the reliability of a TAMR head.

The agglomeration tends to occur to a plasmon generator consisting of gold (Au), which is suitable to generate near-field light, and to occur particularly in the vicinity of the air bearing surface where the volume is small (the part of the plasmon generator that is tapered toward the air bearing surface). In order to suppress the agglomeration, it has been proposed to add 0.2 at % to 2.0 at % of elements such as copper (Cu) and Iron (Fe) to Au to create an alloy and thus improve hardness (U.S. Pat. No. 8,964,514). However, alloys such as AuCu and AuFe are poor in efficiency of surface plasmon propagation, and significant plasmon propagation loss occurs and causes heat generation in the plasmon propagation region of the plasmon generator. Consequently, reliability is decreased. Therefore, although it is effective to suppress the recession (recess) of the end surface of the plasmon generator from the air baring surface, heat generation due to plasmon propagation loss increases.

U.S. Pat. No. 7,529,158, U.S. Pat. No. 8,305,849, and U.S. Pat. No. 8,576,674 disclose techniques for improving the reliability of a thermal assisted magnetic recording head by forming a part of the end of the plasmon generator with a highly heat-resistant material (for example, Pt, Pd, Rh, and Ir), not with Au. However, when the material of the end of a plasmon generator is replaced with Pt, Pd, Rd, Ir, or the like rather than Au, the capability of confining the near-field light decreases, and it is difficult to realize high density recording.

As described above, it is difficult to achieve both improvement in the heat resistance and the mechanical strength of a plasmon generator itself and improvement in the recording performance (for example, recording density) because these variables have a trade-off relationship. Therefore, it is desired in a plasmon generator consisting mainly of Au for improving the recording performance to identify and reduce the factors accelerating the deformation. One of the factors accelerating the deformation of a plasmon generator consisting mainly of Au is, as described above, agglomeration associated with heat generation of the plasmon generator itself, and some countermeasures have been attempted. However, there are limitations on taking countermeasures for heat generation of a plasmon generator while suppressing reduction in the recording performance such as recording density, and the deformation is not sufficiently suppressed in some cases. On the other hand, factors other than heat generation accelerating the deformation of a plasmon generator have not been studied in detail, and thus no particular countermeasure has been taken.

The objective of the present invention is to provide a thermal assisted magnetic recording head capable of suppressing the deformation of the plasmon generation while maintaining the configuration for improving recording performance.

SUMMARY OF THE INVENTION

The thermal assisted magnetic recording head executing magnetic recording while locally heating a magnetic recording medium of the present invention includes a plasmon generator generating surface plasmon and generating near-field light from the surface plasmon at an end surface situated on an air bearing surface facing the magnetic recording medium, a main pole that makes contact with the plasmon generator and that is exposed on the air bearing surface, a metal protective layer situated on an opposite side to the plasmon generator when viewed from the main pole and positioned so as to overlap with a part of the main pole when viewed from one side in the down track direction, and an overcoat protective layer covering the metal protective layer. The overcoat protective layer is formed on a flat surface at least at a position where it overlaps with the main pole when viewed from one side in the down track direction, and the metal protective layer configures a part of the flat surface. Moreover, the overcoat protective layer has a flat bottom surface at least at a position where it overlaps with the main pole when viewed from one side in the down track direction.

The above and other objectives, characteristics, advantages of the present invention will be apparent from the following explanation with reference to the attached drawings exemplifying the present invention.

DETAILED DESCRIPTION OF THE INVENTION

Figure 1:
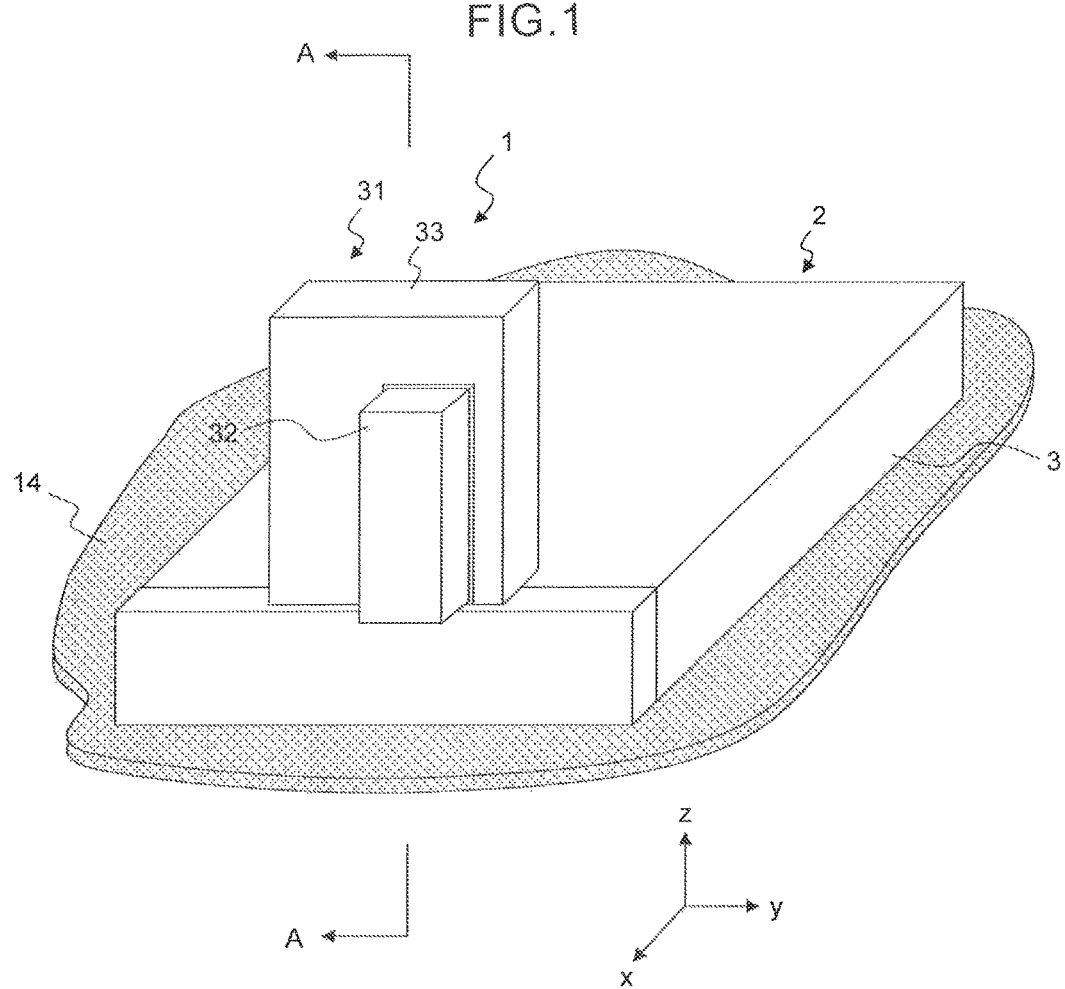
FIG. 1 is an overall perspective view of a thermal assisted magnetic recording head.
Figure 2:
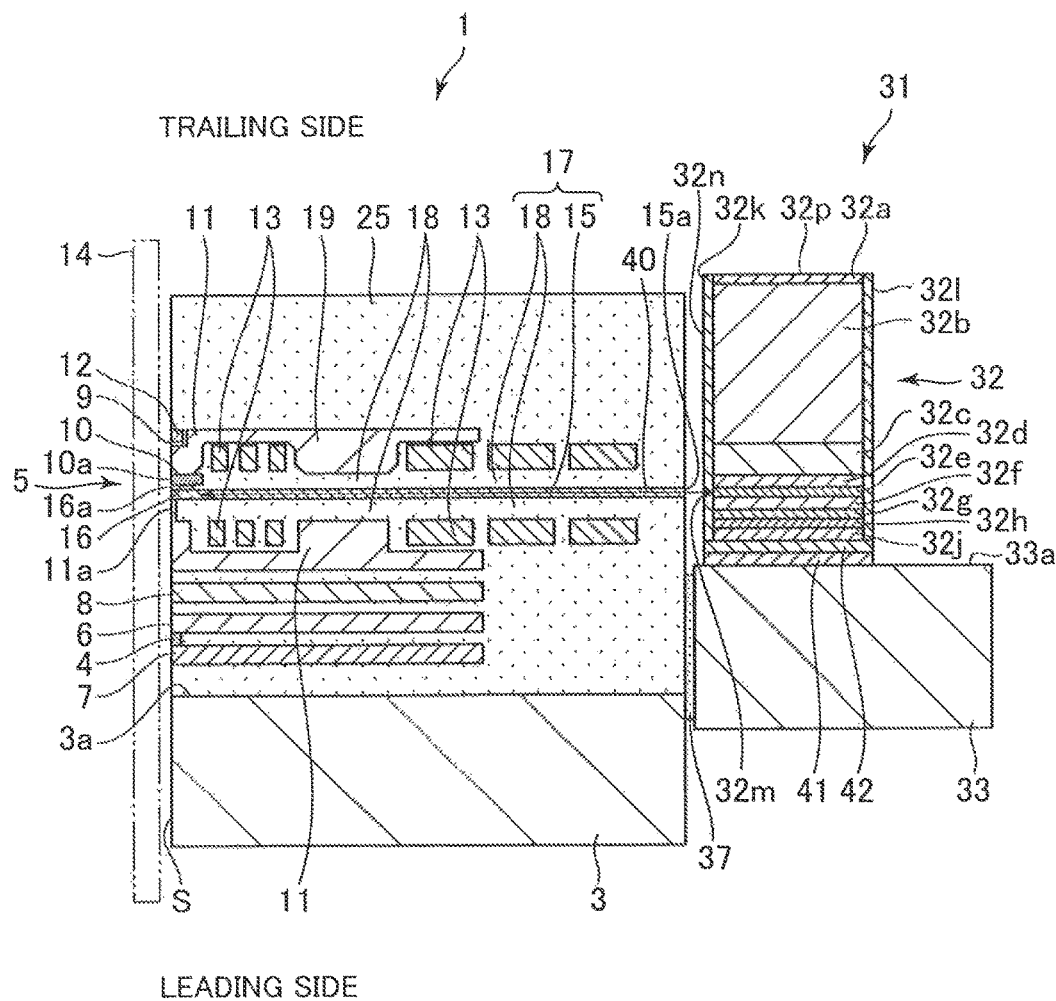
FIG. 2 is a conceptual cross-sectional view of the thermal assisted magnetic recording head according to an embodiment of the present invention.

The configuration of the thermal assisted magnetic recording head according to an embodiment of the present invention will first be described. FIG. 1 is an overall perspective view of a thermal assisted magnetic recording head. FIG. 2 is an overall perspective view of the thermal assisted magnetic recording head taken along sectional line A-A in FIG. 1.

In this specification, the x direction is the down track direction corresponding to the circumferential direction of a magnetic recording medium or the direction orthogonal to an integration surface 3a of a substrate 3 on which an MR (magnetoresistive) element, magnetic recording element, and the like are formed. The y direction is the cross track direction corresponding to the radial direction of a magnetic recording medium. The z direction is the direction orthogonal to the air bearing surface S of a magnetic head slider. The x direction is equal to the film-forming direction L in the wafer process. The x, y, and z directions are orthogonal to each other. The terms "upper" and "lower" refer to the direction leaving the substrate 3 and the direction approaching the substrate, respectively, relative to the x direction. The term "upper" may be substituted by the term "trailing side" and the term "lower" may be substituted by the term "leading side."

A magnetic head 1 has a magnetic head slider 2 and a laser diode unit 31 that is fixed to the magnetic head slider 2 and that emits laser light.

The magnetic head slider 2 has a nearly hexahedral shape, of which one surface configures an air bearing surface S facing a magnetic recording medium 14. The magnetic head slider 2 has an MR element 4, a magnetic recording element 5, a waveguide 17 provided with a core 15 capable of propagating laser light emitted from the laser diode unit 31 as propagated light, and a plasmon generator 16 generating near-field light on the air bearing surface S from the propagated light. These elements are formed on the substrate 3 consisting of AlTiC ($Al_2O_3$-Tic).

The magnetic recording element 5 has a main pole 10 for perpendicular magnetic recording that extends up to the air bearing surface S. The main pole 10 is provided adjacent to the plasmon generator 16. The main pole 10 is in contact with the plasmon generator 16 at least in part. In this way, heat generated by the plasmon generator 16 can be released to the main pole 10. A main pole end surface 10a that is an end surface of the main pole 10 is situated on the air bearing surface S and generates a recording magnetic field on the air bearing surface S. A leading shield 11 is provided on the leading side of the main pole 10 in the x direction (down track direction). The leading shield 11 is magnetically coupled to the main pole 10 via a contact part not-shown to configure an integrated magnetic circuit together with the main pole 10. The leading shield 11 has a shield end surface 11a situated on the air bearing surface S. Coils 13 are provided around the main pole 10. The main pole 10, the leading shield 11, and the contact part are formed from an alloy or the like including any two or three of Ni, Fe, and Co. A metal protective layer 12 is provided above the leading shield 11 in contact with the main pole 10 in the x direction via a non-magnetic layer 9. Moreover, an overcoat layer 25 consisting of $Al_2O_3$ is provided above the magnetic recording element 5 in the x direction.

Magnetic flux generated in the main pole 10 is released from the main pole end surface 10a to the magnetic recording medium 14 as a writing magnetic flux. The magnetic flux released from the main pole end surface 10a enters the magnetic recording medium 14 and magnetizes the recording bits in the vertical direction (z direction). The magnetic flux changes its magnetic path into the in-plane direction of the magnetic recording medium 14 (the x direction), further turns into the vertical direction (z direction) again in the vicinity of the leading shield 11, and is absorbed by the leading shield 11 from the end surface of the leading shield 11.

The magnetic head slider 2 has a waveguide 17 capable of propagating laser light. The waveguide 17 is situated closer to the leading side than the plasmon generator 16 in the down track direction x. The waveguide 17 has the core 15 extending in the z direction and a clad 18 covering the core 15. The core 15 propagates laser light generated in the laser diode unit 31 in the z direction as propagation light 40. The core 15 extends from an end part 15a (the laser light incident end surface) of the magnetic head slider 2 that faces the laser diode unit 31 to the air bearing surface S or near the vicinity. The core 15 is rectangular in a cross-section orthogonal to the propagation direction of the propagated light 40 (the z direction), of which the width (dimension in the y direction) is larger than the thickness (dimension in the x direction). The core 15 can be formed from, for example, TaOx. Here, TaOx means tantalum oxide of any composition, and is typically, but not limited to, $Ta_2O_5$, TaO, $TaO_2$, and the like. The core 15 is covered with a clad 18 having a lower refractive index than the core 15. The clad 18 can be formed from, for example, a dielectric substance such as SiOx and AlOx. Here, SiOx and AlOx mean oxides of Si or Al of any composition, and is typically, but not limited to, $SiO_2$ and $Al_2O_3$.

The magnetic head slider 2 has the MR element 4, of which the end part is situated on the air bearing surface S, and an upper shield layer 6 and a lower shield layer 7 are provided on either side of the MR element 4 in the x direction. The MR element 4 is a reproducing element to read information recorded on a magnetic recording medium and can be any of a Current In Plane (CIP)—Gigantic Magnetoresistive (GMR)_element in which the sense current flows in the y direction, a Current Perpendicular to Plane (CPP)—GMR element in which the sense current flows in the x direction, and a tunneling magnetoresistive (TMR) element in which the sense current flows in the x direction and the tunnel effect is used. When the MR element 4 is a CPP-GMR element or TMR element, the upper shield layer 6 and the lower shield layer 7 are also used as electrodes supplying the sense current. A magnetic shield layer 8 is provided between the MR element 4 and the magnetic recording element 5.

Figure 3:
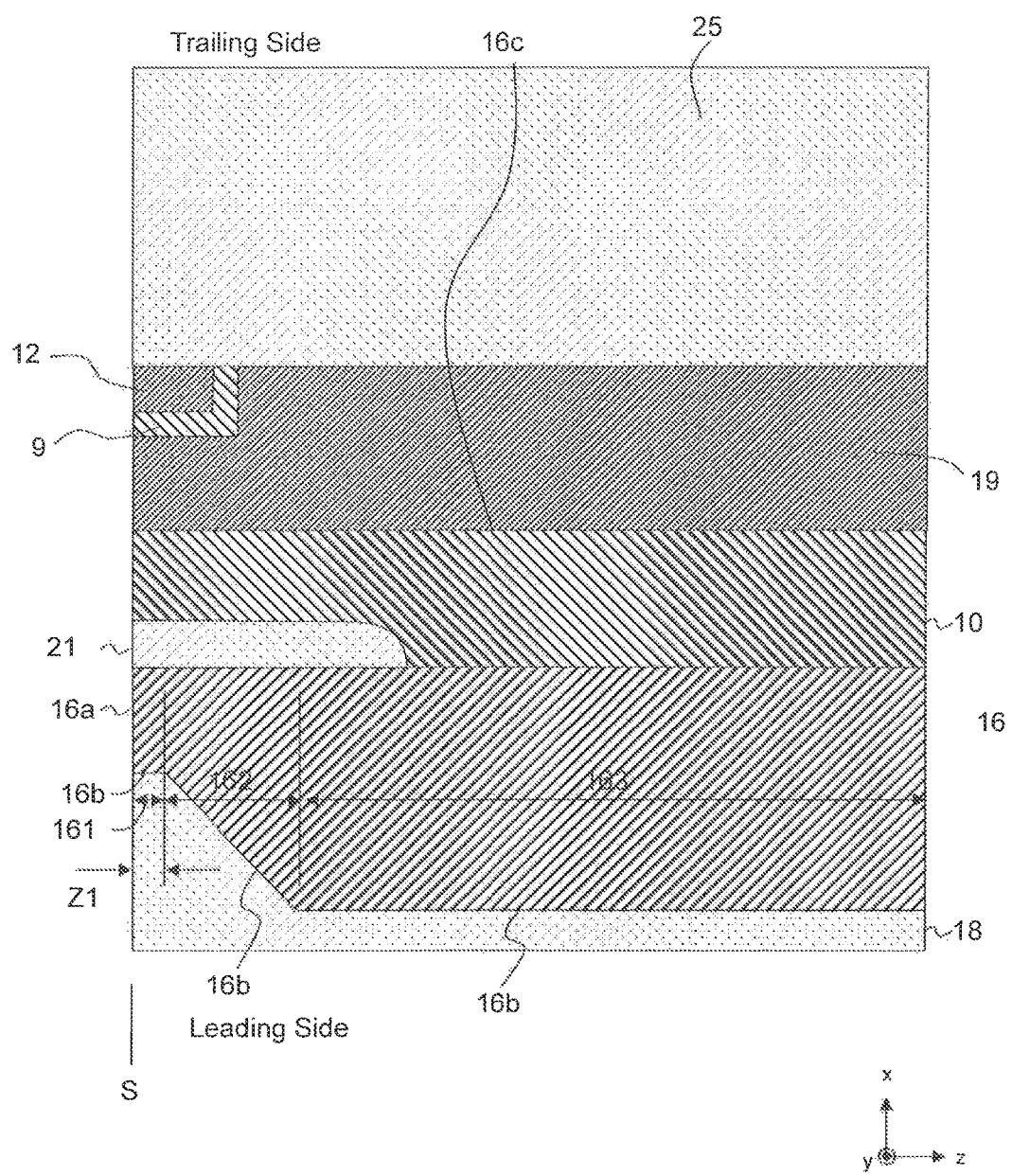
FIG. 3 is an enlarged view of the principal part in FIG. 2.

The magnetic head slider 2 has the plasmon generator 16 generating near-field light on the air bearing surface S from the propagation light 40. The plasmon generator 16 is a columnar metal piece extending in the height direction z. Although simplified in FIG. 2, as shown in FIG. 3, the plasmon generator 16 may have an end part 161 narrowed both in the down track direction x and in the cross track direction y, a main part 163 larger in dimension in the down track direction x than the end part 161 and gradually increased in dimension in the cross track direction y along the height direction z, and a transition part 162 situated between the end part 161 and the main part 163. The plasmon generator 16 may have a trailing side surface 16c extending in parallel to the height direction z and a leading side surface 16b in the form of a step.

The plasmon generator 16 includes an end surface 16a situated on the air bearing surface S. The end surface 16a has a trapezoidal shape of which the long side is on the leading side and the short side is on the trailing side; however, the end surface 16a may have a rectangular, square, triangular, or other shape. The main pole end surface 10a is situated in the vicinity of the end surface 16a. The surface on the leading side out of the surfaces of the plasmon generator 16 extending in the height direction z configures a propagation surface 16b facing the core 15. The propagation surface 16b of the main part 163 is coupled with the propagation light 40 propagated through the core 15 in the surface plasmon mode and generates surface plasmon. The surface plasmon is propagated through the propagation surface 16b to the end surface 16a and generates near-field light at the end surface 16a. As a result, the plasmon generator 16 heats the portion of the magnetic recording medium 14 where information is recorded. The plasmon generator 16 can be formed from a metal consisting mainly of Au or AuCo.

Figure 4:
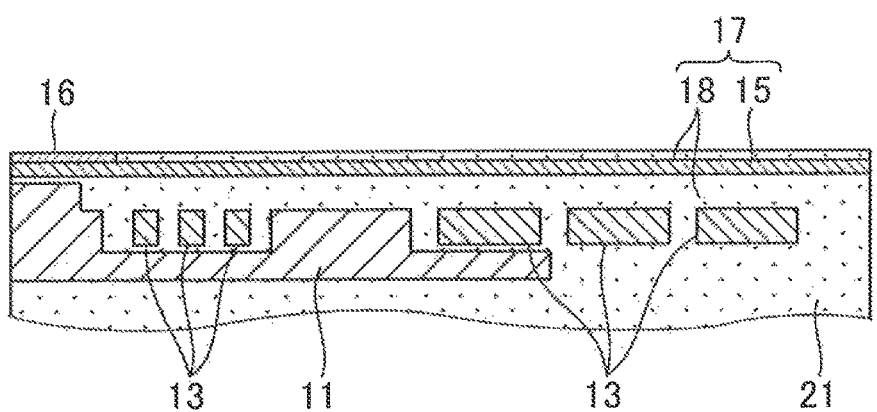
FIGS. 4 to 13 are conceptual cross-sectional views showing sequential steps of the method of producing the thermal assisted magnetic recording head according to the embodiment of the present invention.

The steps of forming the plasmon generator 16, the main pole 10, a trailing shield 19, a top yoke 20, the metal protective layer 12, an overcoat protective layer 25, and the like, which configure the core part of the method of producing the thermal assisted magnetic recording head of the present invention, will be described hereafter with reference to FIGS. 4 to 13. First, the lower shield layer 7, the MR element 4, the upper shield layer 6, the magnetic shield layer 8, the leading shield 11, the lower coils 13, and the waveguide 17 are formed on the substrate 3 shown in FIG. 2, and a non-magnetic insulating material 21 is provided in spaces around and between those members. The non-magnetic insulating material 21 may be configured by the same material as the clad 18 surrounding the core 15 of the waveguide 17. With those members on the leading side in comparison with the waveguide 17 being formed, as shown in FIG. 4, the plasmon generator 16 is formed. The end surface 16a of the plasmon generator 16 is exposed on the air bearing surface S when the magnetic head 1 is completed. The material configuring the plasmon generator 16 is, for example, a metal material including one or more of Pd (palladium), Pt (platinum), Rh (rhodium), Ir (iridium), Ru (ruthenium), Au (gold), Ag (silver), Cu (copper), and Al (aluminum).

Figure 5:
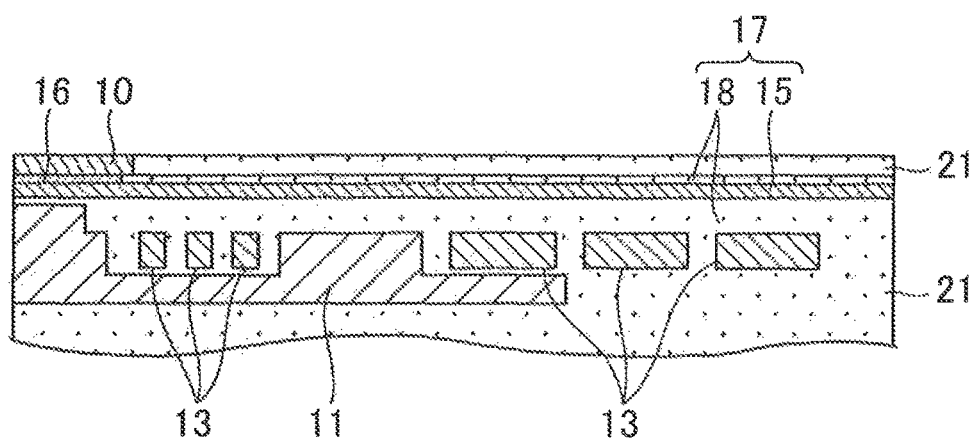

Subsequently, as shown in FIG. 5, the main pole 10 is formed to overlap with the plasmon generator 16 at least in part. Moreover, the non-magnetic insulating material 21 is formed on the part of the top surface of the plasmon generator 16 and the waveguide 17 where the main pole 10 is absent. The main pole 10 is formed by, for example, frame plating or pattern plating of an iron-based alloy (such as iron cobalt alloy (FeCo) or iron cobalt nickel alloy (FeCoNi)). The end surface 10a of the main pole 10 is exposed on the air bearing surface S when the magnetic head 1 is completed.

Figure 6:
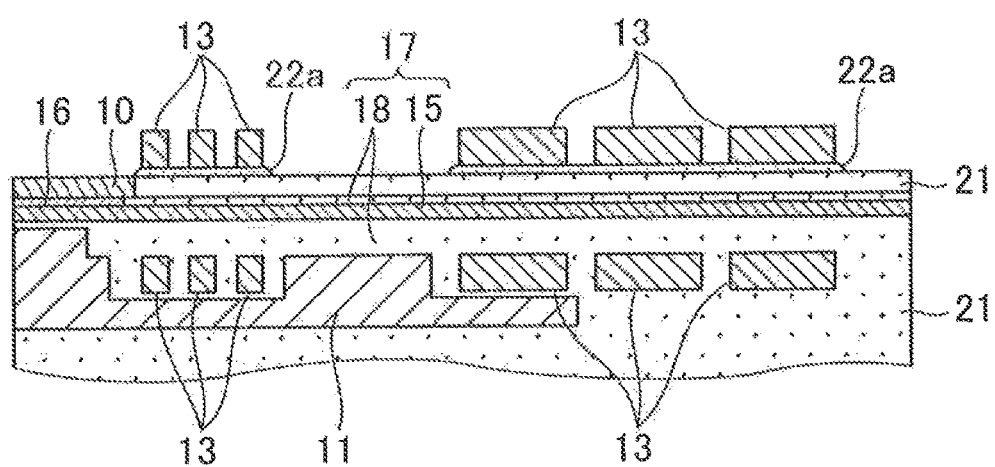
Figure 7:
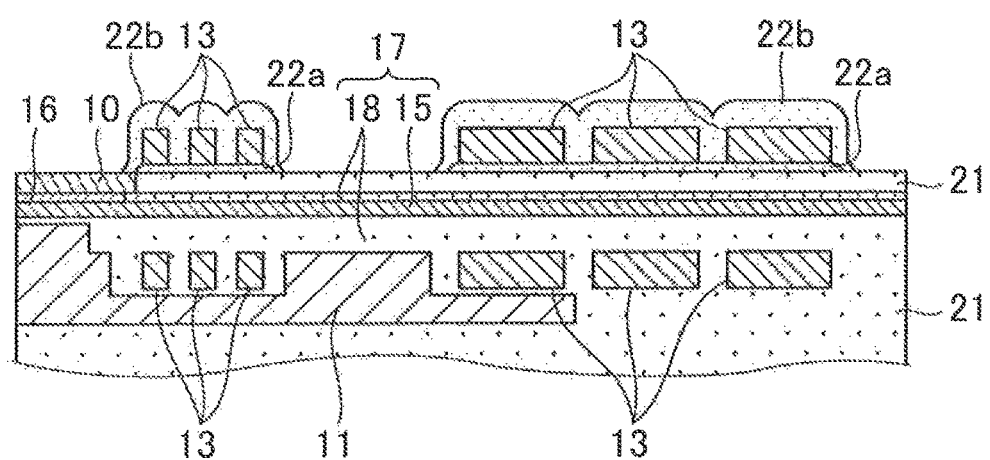
Figure 8:
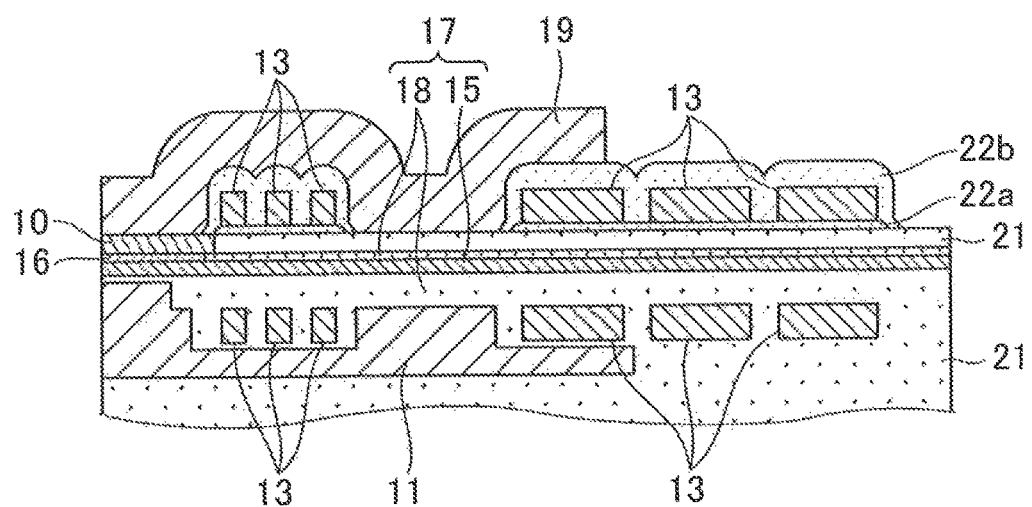

Then, as shown in FIG. 6, coil seats 22a are formed by sputtering and lifting off, milling or the like of a non-magnetic insulating material (for example, $Al_2O_3$, AlN, $SiO_2$, or DLC (diamond like carbon) or the like), and the upper coils 13 are formed on the coil seats 22a. The coils 13 are formed by frame plating, pattern plating or the like of a non-magnetic conductive material (for example, Cu). In the case shown in FIG. 6, the coil 13 on the side closer to the air bearing surface S and the coil 13 on the side closer to the laser diode unit 31 are provided. Furthermore, as shown in FIG. 7, coil insulating films 22b covering the coils 13 are formed. The coil insulating films 22b are formed by sputtering and lifting off, milling or the like of a non-magnetic insulating material (for example, $Al_2O_3$, AlN, $SiO_2$, or DLC). Then, as shown in FIG. 8, the trailing shield 19 is formed to cover the coil insulating films 22b on the side closer to the air bearing surface S. The trailing shield 19 is formed by, for example, frame plating, pattern plating or the like of an iron-based alloy (such as iron cobalt alloy (FeCo) or iron cobalt nickel alloy (FeCoNi)); however, the trailing shield 19 does not need to cover the entire coil insulating films 22b but has to cover them on the side closer to the air bearing surface S, namely on the side where the main pole 10 is provided. The trailing shield 19 may be configured by the same material as the main pole 10 and is in contact with the main pole 10 to configure a magnetic pole.

Figure 9:
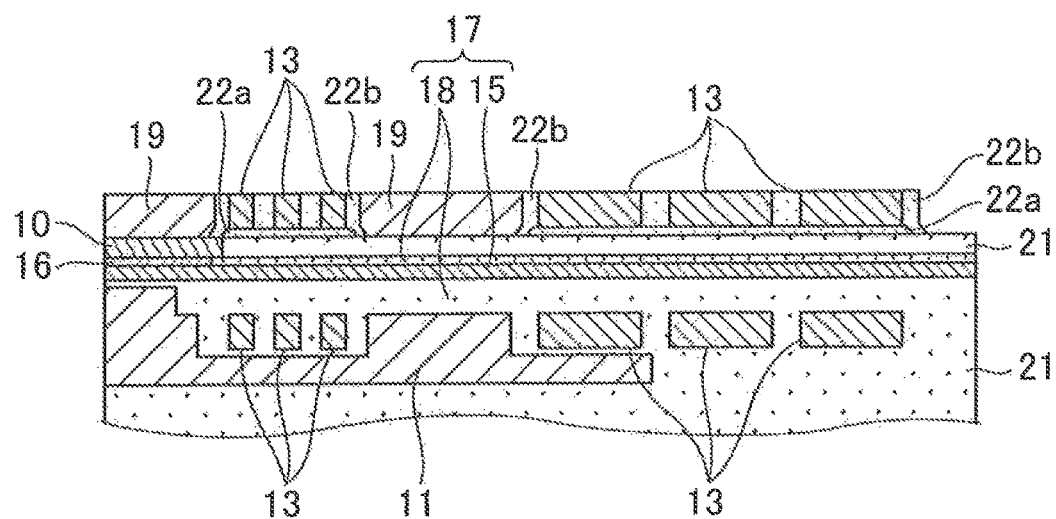
Figure 10:
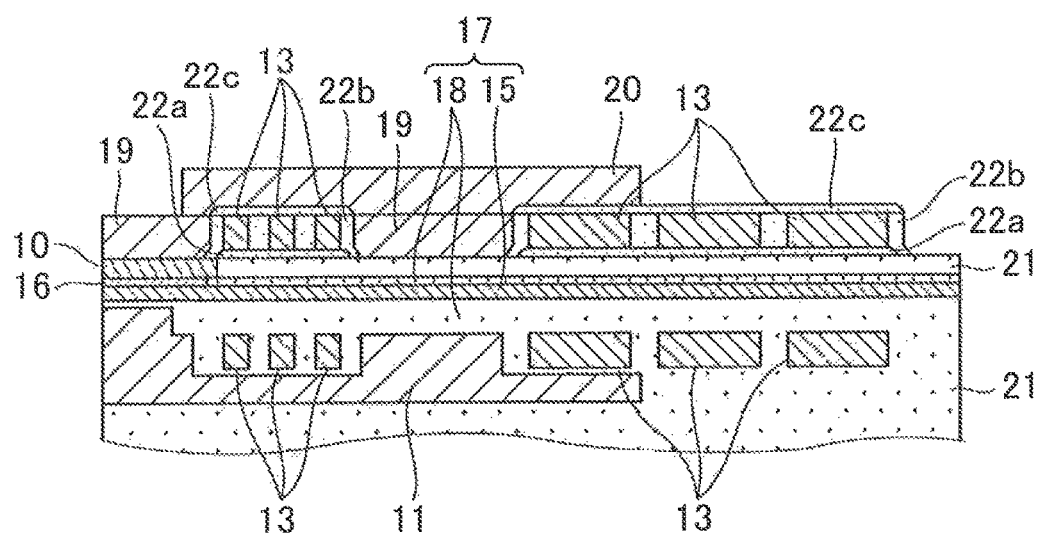

Here, in this embodiment, as shown in FIG. 9, the trailing shield 19 and the coil insulating films 22b are flattened nearly at the upper ends of the upper coils 13 along the direction z parallel to the layers (the direction perpendicular to the air bearing surface S) by Chemical Mechanical Polishing (CMP) or the like. Then, as shown in FIG. 10, coil protective films 22c overlaying the coils 13 are formed by sputtering and lifting off, milling or the like of a non-magnetic insulating material (for example, $Al_2O_3$, AlN, $SiO_2$, DLC, or the like). Subsequently, a top yoke 20 is formed by frame plating or pattern plating of an iron-based alloy (such as iron cobalt alloy (FeCo), iron cobalt nickel alloy (FeCoNi), and iron nickel alloy (FeNi)) to cover the coil protective films 22c and trailing shield 19 on the side closer to the air bearing surface S. The top yoke 20 does not need to cover the entire coil protective films 22c but is formed to cover the coil protective films 22c and trailing shield 19 excluding the portion in the vicinity of the air bearing surface S and excluding the portion on the side closer to the laser diode unit 31. The top yoke 20 may be formed by the same material as the trailing shield 19.

Figure 11:
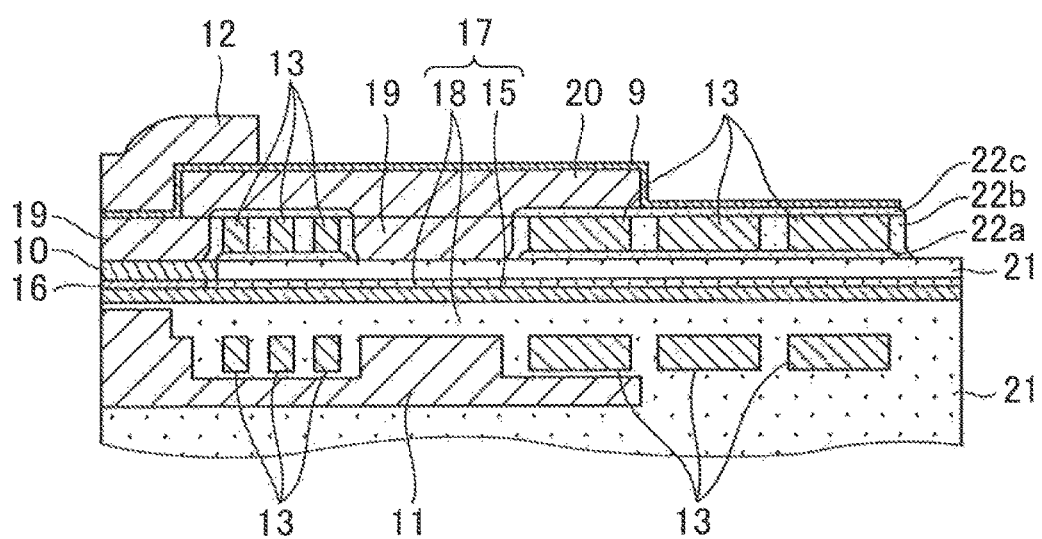

Then, as shown in FIG. 11, the non-magnetic layer 9 is formed to cover the top yoke 20, the portion of the trailing shield 19 on the side closer to the air bearing surface S where the top yoke 20 is absent, and the coil protective film 22c. The non-magnetic layer 9 is formed by sputtering or the like of an alloy such as alumina or a metal such as Ti, Pt, Pd, Ru, Rh, Ir, Ta, W, Mo, and Zr. Then, the metal protective layer 12 is formed to cover the non-magnetic layer 9 in the vicinity of the air bearing surface S. The metal protective layer 12 consists of a material selected from, for example, Ni, NiFe, NiFeCo, Cr, Cu, Au, Pt, Pd, Ru, Rh, Ir, Ta, W, Mo, and Zr, and is formed by frame plating, pattern plating, sputtering and milling, sputtering and lifting off, or the like to a thickness of 0.5 μm or larger. The metal protective layer 12 may be formed with the same material as the trailing shield 19 or a different material, and preferably consists of a low magnetic flux density material. When the metal protective layer 12 consists of a non-magnetic material, it is not necessary to form the non-magnetic layer 9.

Figure 12:
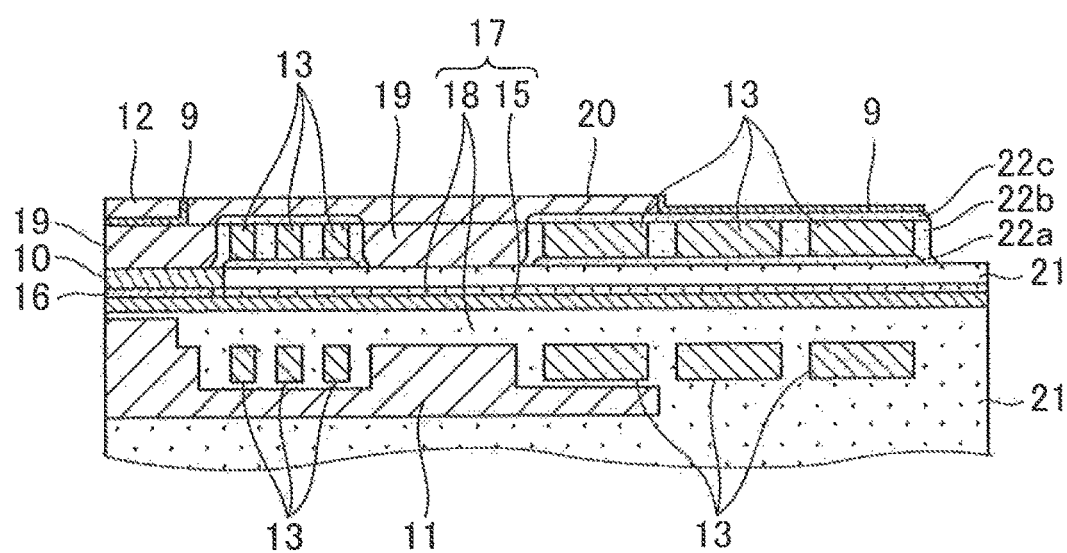
Figure 13:
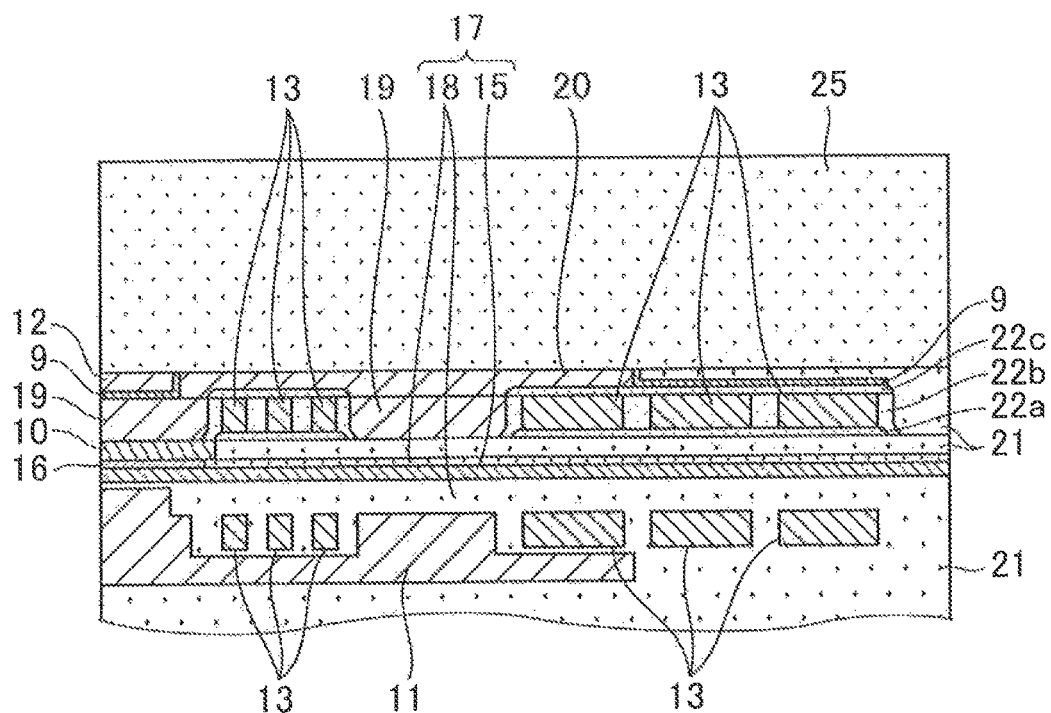

Then, as shown in FIG. 12, the top yoke 20 on which the metal protective layer 12 and the non-magnetic layer 9 are layered is flattened by CMP or the like. As a result, the metal protective layer 12, the top yoke 20, and a portion of the non-magnetic layer 9 form one same flat surface. On this flat surface, as shown in FIG. 13, an overcoat protective layer 25 consisting of $Al_2O_3$ is formed. Furthermore, the lateral surface of the multilayer body formed as described above is polished as a whole. The polished surface becomes the air bearing surface S. The laser diode unit 31 is attached to the magnetic head slider 2 that is the multilayer body formed as described above to configure the thermal assisted magnetic head 1 shown in FIG. 2. The detailed configuration of the laser diode unit 31 will be described later.

One of the characteristics of the thermal assisted magnetic recording head 1 of the present embodiment is that the overcoat protective layer 25 is formed on a flat surface. In other words, as shown in FIG. 12, The surface on which the overcoat protective layer 25 is formed is the flat surface formed by flattening the top yoke 20 on which the metal protective layer 12 and the non-magnetic layer 9 are layered by CMP or the like. Moreover, although not described in detail, a non-magnetic insulating layer 21 may be formed on the side opposite to the air bearing surface S (the side where the laser diode unit 31 is attached) and configure the above-described flat surface together with the metal protective layer 12, the top yoke 20, and the non-magnetic layer 9. Consequently, as shown in FIG. 13, the overcoat protective layer 25 has a flat bottom surface, the technical significance of which will be described below.

Figure 14:
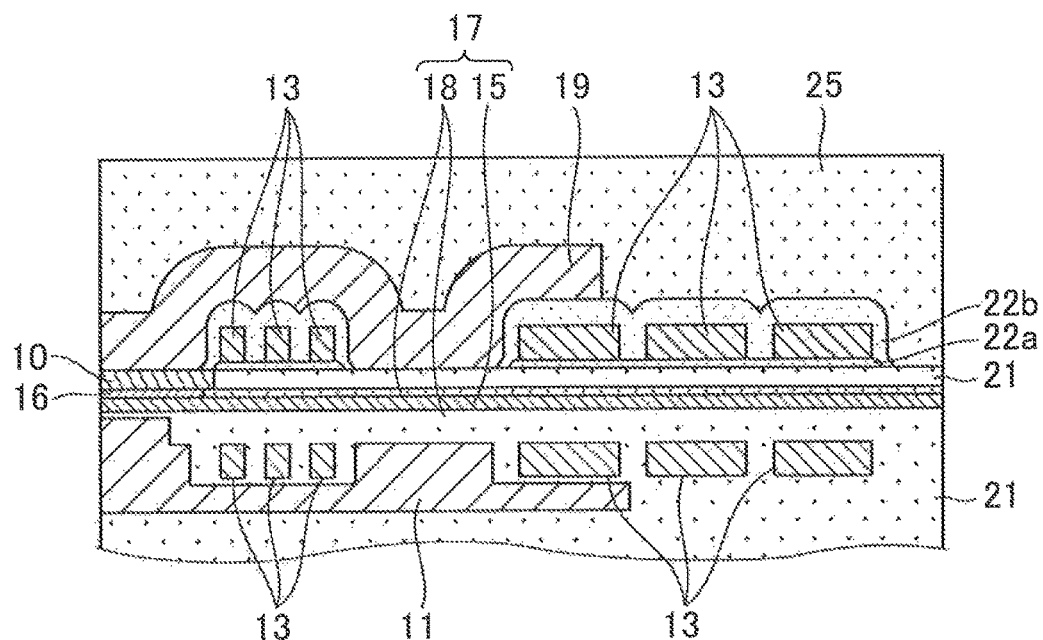
FIGS. 14 and 15 are conceptual cross-sectional views showing the principal part of a step of the prior art method of producing a thermal assisted magnetic recording head.
Figure 15:
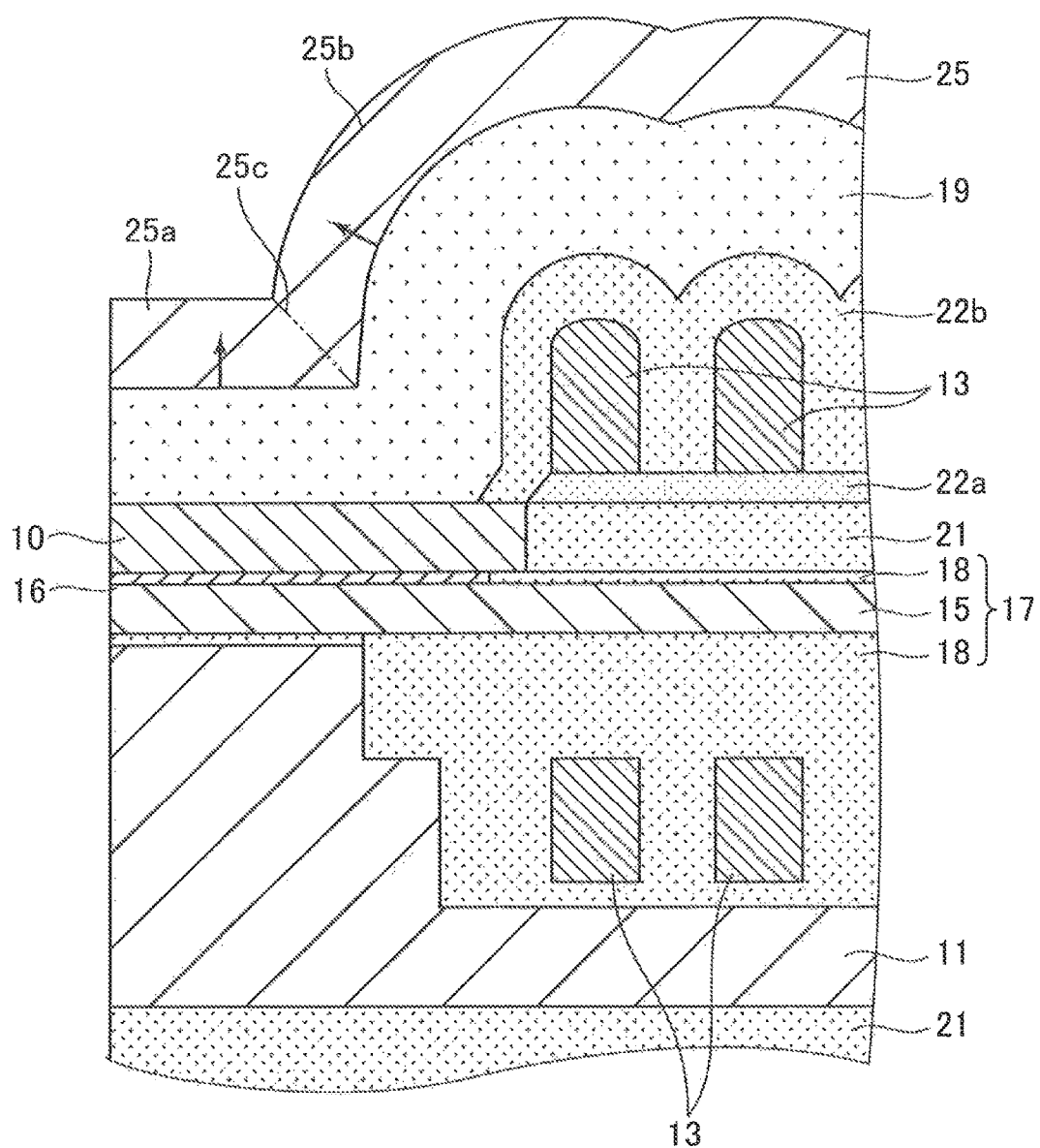

In the prior art method of producing a thermal assisted magnetic recording head, the plasmon generator 16, the main pole 10, the coil seats 22a, the coils 13, the coil insulating films 22b, and the trailing shield 19 (see FIGS. 4 to 8) are formed as in the above-described embodiment. Subsequently, the overcoat protective layer 25 is immediately formed without flattening the trailing shield 19 and the coil insulating films 22b, forming the coil protective films 22c, the top yoke 20, the non-magnetic layer 9, and the metal protective layer 12, or flattening the metal protective layer 12 and the top yoke 20 (see FIG. 14). In such a case, the overcoat protective layer 25 is formed on a significantly uneven surface (mainly the trailing shield 19). For example, when the overcoat protective layer 25 is formed by sputtering $Al_2O_3$, the film is formed by sputtering on the surface extending in the z direction and on the surface extending in the x direction perpendicular to the z direction concurrently as schematically shown in FIG. 15. As a layer 25a formed on the surface extending in the z direction and a layer 25b formed on the surface extending in the x direction grow in the arrowed directions, respectively, a part 25c where the layers 25a and 25b abut on and join each other occurs. The part 25c where the layers 25a and 25b join is a heterophase part obliquely extending with respect to the z direction and the x direction. This heterophase part 25c causes mechanical stress on the underlying main pole 10 and the plasmon generator 16 in contact with it when the thick overcoat protective layer 25 expands, particularly after the lateral surface of the multilayer body is polished as a whole on the air bearing surface S. The inventors of the present invention found that this mechanical stress is one of the factors accelerating the deformation (contraction) of the plasmon generator 16. In other words, it was found that in addition to the above-described agglomeration associated with heat generation of the plasmon generation itself, the mechanical stress associated with occurrence of the heterophase part 25c of the overcoat protective layer 25 that is relatively thicker (in the order of several tens of μm) than the other layers accelerates the deformation of the plasmon generator 16. The presence of such mechanical stress due to a thick dielectric protective film in a magnetic head is pointed out also in a non-patent document 1 "Enhanced GMR Ratio of Dual Spin Valve With Monolayer Pinned Structure, IEEE TRANSACTIONS ON MAGNETICS, VOL. 42, NO. 2, FEBRUARY 2006." Moreover, although not described in detail, it was confirmed by experiments that the deformation (recession from the air bearing surface) of the plasmon generator 16 is suppressed by removing a part of the overcoat protective layer 25 by chamfering or the like before polishing the lateral surface of the multilayer body as a whole on the air bearing surface S in comparison with no part being removed. This suggests that the thick overcoat protective layer 25 accelerates the deformation of the plasmon generator 16.

Thus, the present invention suppresses the deformation of the plasmon generator 16 by alleviating the mechanical stress on the main pole 10 and the plasmon generator 16. Specifically, the overcoat protective layer 25 is formed on a flat surface so that no heterophase part occurs. To this end, as shown in FIG. 12, the top yoke 20 on which the metal protective layer 12 and the non-magnetic layer 9 are formed is flattened by CMP or the like. As a result, the material configuring the overcoat protective layer 25 (for example, $Al_2O_3$) is formed only on the surface extending in the z direction, and no joint occurs. Consequently, even when the thick overcoat protective layer 25 expands, no mechanical stress is applied to the underlying main pole 10 and the plasmon generator 16, so no deformation of the plasmon generator 16 occurs. Therefore, excellent thermal assisted magnetic recording is conducted for a long period of time.

However, the present invention prevents occurrence of a heterophase part (the joint) of the thick overcoat protective layer 25 to suppress mechanical stress on the main pole 10 and plasmon generator 16. Therefore, there is almost no problem even if the surface on which the overcoat protective layer 25 is formed is not flat in part, as long as that part is situated where no mechanical stress is likely to be applied to the main pole 10 and the plasmon generator 16. In other words, the surface on which the overcoat protective layer 25 is formed does not have to be entirely flat. The surface on which the overcoat protective layer 25 is formed has only to be flat at least in the vicinity of the air bearing surface S, specifically in the portion where the overcoat protective layer 25 overlaps with the main pole 10, the plasmon generator 16, and the coil 13 nearest to the air bearing surface S when viewed from one side in the lamination direction.

Moreover, in the present invention, the metal protective layer 12 is provided between the overcoat protective layer 25 and the main pole 10. The metal protective layer 12 prevents mechanical stress due to the thick overcoat protective layer 25 not directly acting on the main pole 10 and the plasmon generator 16 in contact with it. In other words, the relatively strong metal protective layer 12 suppresses transmission of the mechanical stress from the overcoat protective layer 25 to the main pole 10 and the plasmon generator 16 to some extent. As a result, even if mechanical stress due to the overcoat protective layer 25 occurs, the mechanical stress is less likely to be transmitted to the main pole 10 and the plasmon generator 16, thereby suppressing acceleration of the deformation of the plasmon generator 16. Here, the non-magnetic layer 9 is provided between the metal protective layer 12 and the main pole 10.

When the metal protective layer 12 consists of Ni, NiFe, NiFeCo, or the like, the metal protective layer 12 can be flattened on the same plane as the trailing shield 19 by CMP, whereby advantageously it is possible to easily prevent potential difference corrosion in the process of layering and processing and facilitate production. It is preferable that the metal protective layer 12 consists of a material that is unlikely to absorb a magnetic field leaking from the trailing shield 19. Out of such materials, Ni is most preferable, and NiFe is second most preferable. When the metal protective layer 12 consists of Cr, Pt, Pd, Ru, Rh, Ir, Ta, W, Mo, Zr, or the like, these non-magnetic metal materials are advantageously hard enough to be exposed on the air bearing surface S. Moreover, Cu and Au are also non-magnetic metal materials. When the metal protective layer 12 consists of such non-magnetic metal materials, it is possible to omit the non-magnetic layer 9 between the metal protective layer 12 and the main pole 10.

As described above, this embodiment can suppress the deformation of the plasmon generator 16 by suppressing the occurrence of a heterophase part of the overcoat protective layer 25 and thereby suppressing the occurrence of mechanical stress. Even if mechanical stress occurs, it is less likely to be transmitted to the main pole 10 and the plasmon generator 16 and therefore, the deformation of plasmon generator 16 is suppressed. In other words, it is less likely that the plasmon generator 16 recedes from the air bearing surface S and the distance to the magnetic recording medium 14 is increased, whereby it is possible to suppress problems such as reduction with time in the ability of heating the magnetic recording medium 14 and deterioration in the S/N ratio associated with such reduction. With this method being executed along with a countermeasure for heat generation causing the agglomeration at the end surface of the plasmon generator 16, suppression of the deformation of the plasmon generator 16 can be obtained.

Experimental results showing that the present invention can suppress the deformation (recession from the air bearing surface S) of the plasmon generator 16 are given below. In this experiment, approximately 2000 thermal assisted magnetic recording heads 1 were formed under the same conditions, and heated at 220° C. for three hours after the lateral surface of the multilayer body situated on the air bearing surface S was polished. The polished surface was observed with a SEM (scanning electron microscope) to check whether the end surface 16a of the plasmon generator 16 receded from the air bearing surface S. Table 1 shows the results of the above experiment conducted with different conditions mainly regarding the thicknesses of the metal protective layer 12, the non-magnetic layer 9 situated between the metal protective layer 12 and the main pole 10, and the overcoat protective layer 25 and the state of the surface on which the overcoat protective layer 25 is formed were changed.

TABLE 1

| | Metal protective layer | Non-magnetic layer | Overcoat protective layer | Surface on which overcoat protective layer is formed | Occurrence of deformation |
|---|---|---|---|---|---|
| Prior Art 1 | Absent | Absent | 25 μm | Raised parts | 2.4% |
| Prior Art 2 | Absent | Absent | 15 μm | Raised parts | 2.6% |
| Embodiment 1 | NiFe 2 μm | Al$_2$O$_3$ 0.5 μm | 25 μm | Flat | 0.0% |
| Embodiment 2 | NiFe 2 μm | Ti 0.5 μm | 25 μm | Flat | 0.0% |
| Embodiment 3 | NiFe 1 μm | Ti 0.5 μm | 25 μm | Flat | 0.0% |
| Embodiment 4 | NiFe 0.5 μm | Ti 0.5 μm | 25 μm | Flat | 0.3% |
| Comparative Example 1 | Absent | Absent | 25 μm | Flat | 1.1% |

As is apparent from Table 1, when the metal protective layer 12 is absent and the surface on which the overcoat protective layer 25 is formed is configured to have convex parts particularly in the portions where the coils 13 are formed (Prior Art 1 and 2), the occurrence of deformation is higher than 2%, which is unfavorable. Moreover, the occurrence of deformation is slightly higher with the configuration in which the surface on which the overcoat protective layer 25 is formed is flat but the metal protective layer 12 is absent (Comparative Example 1). Conversely, the occurrence of deformation is lower than 1% and excellent results are obtained with the configuration in which the metal protective layer 12 is provided via the non-magnetic layer 9 and the surface on which the overcoat protective layer 25 is formed is flattened. Particularly, it is preferable that the metal protective layer 12 has a certain degree of thickness (for example, 0.5 μm or larger).

The laser diode unit 31 attached to the magnetic head slider 2 as described above will be described in detail with reference to FIG. 2. The laser diode unit 31 is situated to face the opposite surface of the magnetic head slider 2 to the air bearing surface S. The laser diode unit 31 emits laser light in the direction z perpendicular to the air bearing surface S toward the core 15 of the waveguide 17 of the magnetic head slider 2. The laser diode unit 31 is soldered to the magnetic head slider 2 by an adhesive layer 37.

The laser diode unit 31 includes a laser diode 32 that is a laser light generation element and a sub-mount 33 to mount the laser diode 32. The laser diode 32 supplies laser light to the core 15. The sub-mount 33 consists of a Si substrate or the like. The laser diode 32 is mounted on a mounting surface 33a of the sub-mount 33. Specifically, a first electrode (p electrode) 32j of the laser diode 32 is fixed to a pad 41 provided on the mounting surface 33a of the sub-mount 33 with a solder material 42.

The laser diode 32 is of an end surface-emitting type and can be an InP, GaAs, or GaN-based one or the like generally used for communication, optical disc storages, or material analysis. The wavelength of emitted laser light is not particularly restricted. Wavelengths of 375 nm to 1.7 μm are usable, and particularly wavelengths of 650 to 900 nm are preferably used.

The laser diode 32 has, for example, but is not limited to, a configuration in which an n electrode 32a configuring the second electrode, an n-GaAs substrate 32b, an n-InGaAlP clad layer 32c, a first InGaAlP guide layer 32d, an active layer 32e consisting of a multiquantum well (InGaP/InGaAlP) and the like, a second InGaAlP guide layer 32f, a p-InGaAlP clad layer 32g, a p electrode under layer 32h, and a p electrode 32j configuring the first electrode are layered in sequence. Reflecting layers 32k and 32l for exciting oscillation by total reflection are formed on the front and the back of the cleaved surfaces of the laser diode 32. The surface of the reflecting layer 32k, namely the surface of the laser diode 32 that faces the magnetic head slider 2 configures a light-emitting surface 32n of the laser diode 32. The emission center 32m is present on the reflecting layer 32k at the position of the active layer 32e. The n electrode 32a and the p electrode 32j can be made of Au or Au alloy of approximately 0.1 μm in thickness. While the hard disc device is in operation, the laser diode 32 is powered by a power source within the hard disc device via the first electrode 32j and the second electrode 32a.

A head gimbal assembly on which the thermal assisted magnetic recording head 1 is mounted will be described hereafter.

Figure 16:
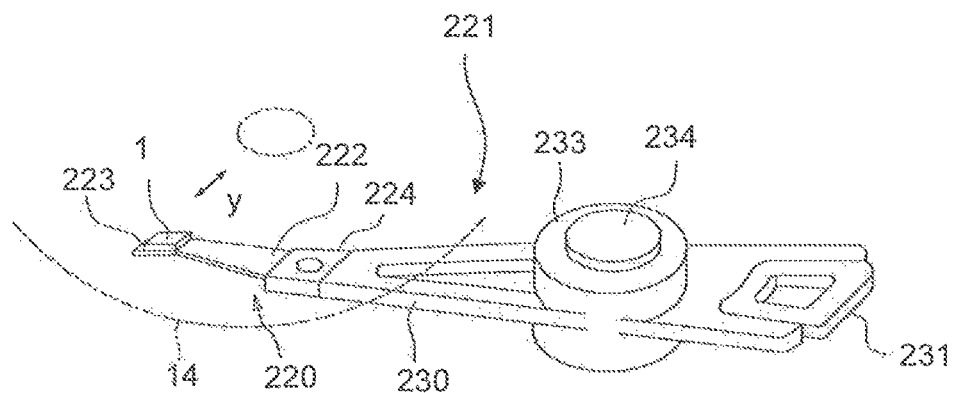
FIG. 16 is a perspective view of the head arm assembly of the present invention.

With reference to FIG. 16, a head gimbal assembly 220 includes the thermal assisted magnetic recording head 1 and a suspension 221 elastically supporting the thermal assisted magnetic recording head 1. The suspension 221 has a plate spring load beam 222 formed with stainless steel, a flexure 223 provided at one end of the load beam 222, and a base plate 224 provided at the other end of the load beam 222. The thermal assisted magnetic recording head 1 is joined to the flexure 223 and given a proper degree of freedom. The portion of the flexure 223 where the thermal assisted magnetic recording head 1 is attached is provided with a gimbal part for maintaining the orientation of the thermal assisted magnetic recording head 1 constant.

The head gimbal assembly 220 attached to an arm 230 is called a head arm assembly 221. The arm 230 moves the thermal assisted magnetic recording head 1 in the cross track direction y of the recording medium 14. One end of the arm 230 is attached to the base plate 224. A coil 231 serving as a part of a voice coil motor is attached to the other end of the arm 230. A bearing part 233 is provided in a middle part of the arm 230. The arm 230 is rotatably supported by a shaft 234 attached to the bearing part 233. The arm 230 and voice coil motor driving the arm 230 configure an actuator.

Figure 17:
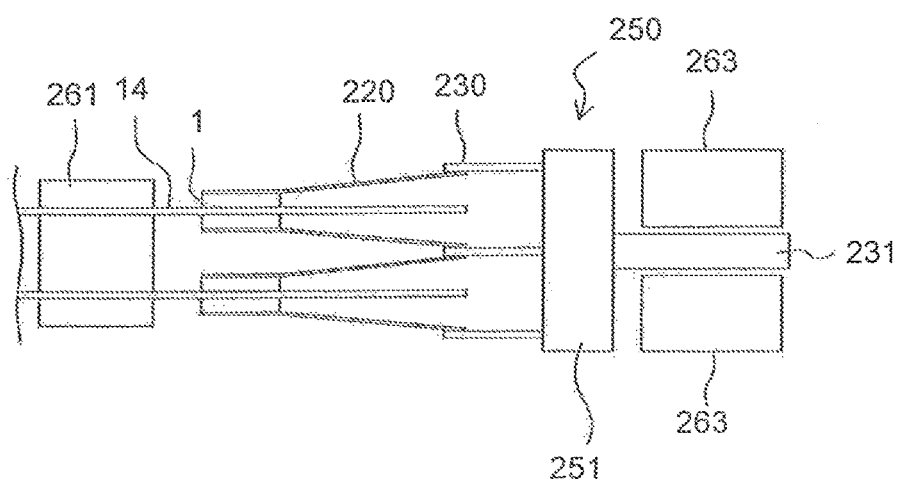
FIG. 17 is a side view of the head stack assembly of the present invention.
Figure 18:
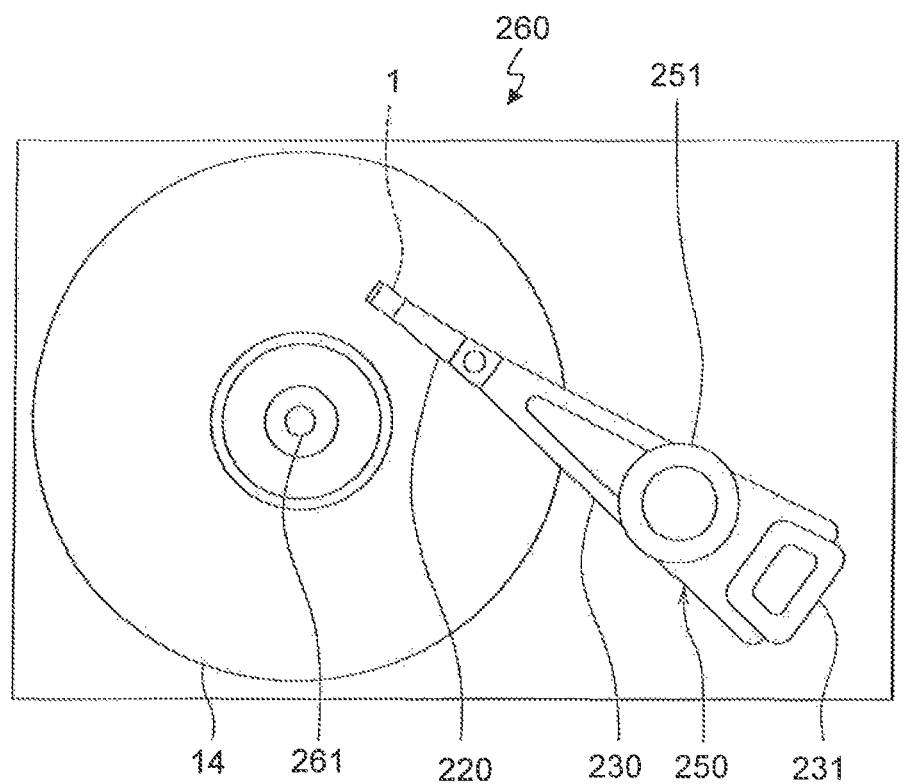
FIG. 18 is a plan view of the magnetic recording device of the present invention.

A head stack assembly and a magnetic recording device in which the above-described thermal assisted magnetic recording head 1 is installed will be described hereafter with reference to FIGS. 17 and 18. A head stack assembly 250 consists of a carriage having a plurality of arms to each of which the head gimbal assembly 220 is attached. FIG. 17 is a side view of a head stack assembly, and FIG. 18 is a plan view of a magnetic recording device. A head stack assembly 250 has a carriage 251 having a plurality of arms 230. The head gimbal assemblies 220 are attached to each arm 230 so as to be arranged in the vertical direction with a space in-between. A coil 231 serving as a part of the voice coil motor is attached to the carriage 251 on the opposite side to the arms 230. The voice coil motor has permanent magnets 263 facing each other across the coil 231.

With reference to FIG. 18, the head stack assembly 250 is installed in a magnetic recording device 260. The magnetic recording device 260 has a plurality of magnetic recording media 14 attached to a spindle motor 261. For each magnetic recording medium 14, two thermal assisted magnetic recording heads 1 are provided to face each other across the magnetic recording medium 14. The head stack assembly 250 excluding the thermal assisted magnetic recording heads 1 and the actuator correspond to the positioning device, supporting the thermal assisted magnetic recording heads 1 and positioning the thermal assisted magnetic recording heads 1 with respect to the magnetic recording medium 14. The thermal assisted magnetic recording heads 1 are moved in the cross track direction of the magnetic recording medium 14 and are positioned with respect to the magnetic recording medium 14 by the actuator. The thermal assisted magnetic recording heads 1 record information on the magnetic recording medium 14 with the magnetic recording element 5 and reproduce information recorded on the magnetic recording medium 14 with the MR element 4.

A desirable embodiment of the present invention is presented and described in detail above. However, it is understood that various changes and modification are available to the extent of not departing from the gist or scope of the attached claims.

What is claimed is:

1. A thermal assisted magnetic recording head for executing magnetic recording while locally heating a magnetic recording medium, comprising:
    a plasmon generator generating surface plasmon and generating near-field light from the surface plasmon at an end surface situated on an air bearing surface facing the magnetic recording medium;
    a main pole being in contact with the plasmon generator and exposed on the air bearing surface;
    a metal protective layer situated on an opposite side to the plasmon generator when viewed from the main pole and positioned to overlap with a part of the main pole when viewed from one side in a down track direction; and
    an overcoat protective layer covering the metal protective layer,
    wherein the overcoat protective layer is formed on a flat surface at least at a position where it overlaps with the main pole when viewed from the one side in the down track direction, and the metal protective layer configures a part of the flat surface.

2. The thermal assisted magnetic recording head according to claim 1, further comprising:
    coils for generating a magnetic field in the main pole,
    wherein the overcoat protective layer is formed on a flat surface at least at a position where it overlaps with the main pole and a coil nearest to the main pole when viewed from the one side in the down track direction.

3. The thermal assisted magnetic recording head according to claim 1, wherein the overcoat protective layer has a thickness of 10 μm or larger.

4. The thermal assisted magnetic recording head according to claim 1, wherein the metal protective layer is a layer including at least one of Ni, NiFe, NiFeCo, Cr, Cu, Au, Pt, Pd, Ru, Rh, Ir, Ta, W, Mo, and Zr, and having a thickness of 0.5 μm or larger.

5. A head gimbal assembly comprising the thermal assisted magnetic recording head according claim 1, and a suspension elastically supporting the thermal assisted magnetic recording head,
wherein the suspension has a flexure to which the thermal assisted magnetic recording head is joined, a load beam of which one end is connected to the flexure, and a base plate connected to the other end of the load beam.

6. A magnetic recording device, comprising the thermal assisted magnetic recording head according to claim 1, the magnetic recording medium situated to face the thermal assisted magnetic recording head, a spindle motor rotary driving the magnetic recording medium, and a positioning device supporting and positioning the thermal assisted magnetic recording head with respect to the magnetic recording medium.

7. A thermal assisted magnetic recording head for executing magnetic recording while locally heating a magnetic recording medium, comprising:
a plasmon generator generating surface plasmon and generating near-field light from the surface plasmon at an end surface situated on an air bearing surface facing the magnetic recording medium;
a main pole in contact with the plasmon generator and exposed on the air bearing surface;
a metal protective layer situated on an opposite side to the plasmon generator when viewed from the main pole and positioned to overlap with a part of the main pole when viewed from one side in a down track direction; and
an overcoat protective layer covering the metal protective layer,
wherein the overcoat protective layer has a flat bottom surface at least at a position where it overlaps with the main pole when viewed from the one side in the down track direction.

8. The thermal assisted magnetic recording head according to claim 7, further comprising:
coils for generating a magnetic field in the main pole,
wherein the overcoat protective layer has a flat bottom surface at least at a position where it overlaps with the main pole and a coil nearest to the main pole when viewed from the one side in the down track direction.

9. The thermal assisted magnetic recording head according to claim 7, wherein the overcoat protective layer has a thickness of 10 μm or larger.

10. The thermal assisted magnetic recording head according to claim 7, wherein the metal protective layer is a layer including at least one of Ni, NiFe, NiFeCo, Cr, Cu, Au, Pt, Pd, Ru, Rh, Ir, Ta, W, Mo, and Zr, and having a thickness of 0.5 μm or larger.

11. A head gimbal assembly comprising the thermal assisted magnetic recording head according claim 7, and a suspension elastically supporting the thermal assisted magnetic recording head, wherein the suspension has a flexure to which the thermal assisted magnetic recording head is joined, a load beam of which one end is connected to the flexure, and a base plate connected to the other end of the load beam.

12. A magnetic recording device, having the thermal assisted magnetic recording head according to claim 7, the magnetic recording medium situated to face the thermal assisted magnetic recording head, a spindle motor rotary driving the magnetic recording medium, and a positioning device supporting and positioning the thermal assisted magnetic recording head with respect to the magnetic recording medium.

* * * * *